Feb. 16, 1954   P. R. T. TRECKMANN   2,669,271
CENTRIFUGAL BLOWER AND CUTTER FOR
COMMINUTING AND CONVEYING FODDER
Filed Oct. 15, 1951
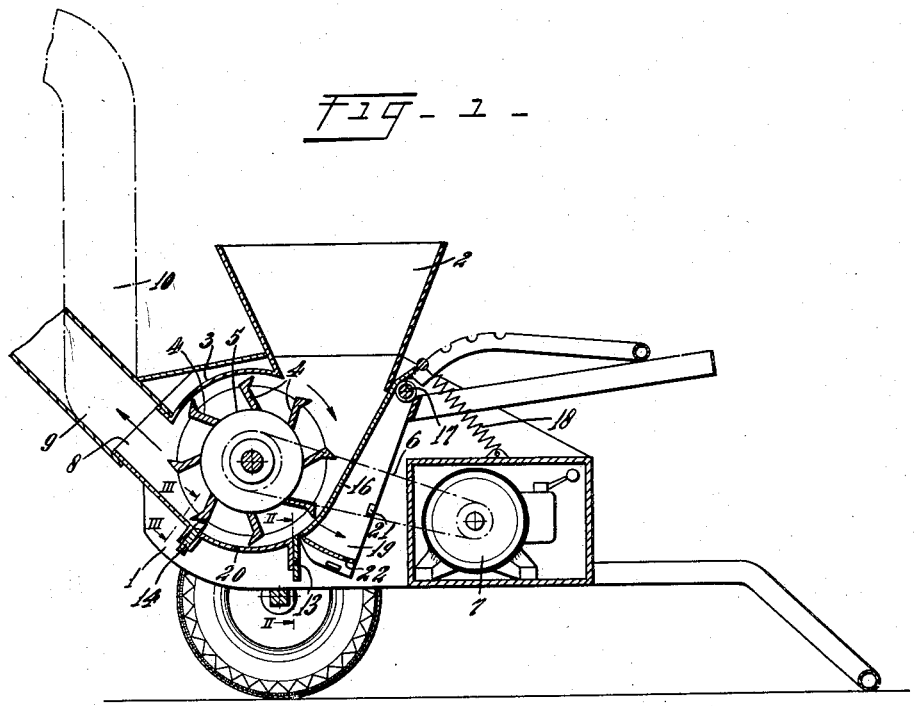
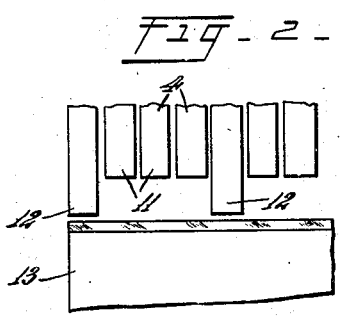 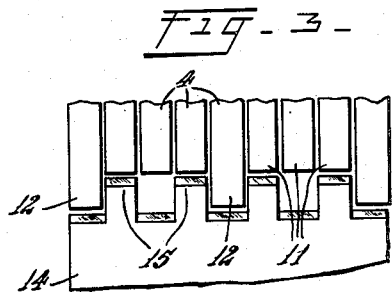
INVENTOR.
Paul Robert Theodor Treckmann
BY
Henderoth, Lind + Ponack
Attorneys.

Patented Feb. 16, 1954

2,669,271

UNITED STATES PATENT OFFICE 2,669,271

CENTRIFUGAL BLOWER AND CUTTER FOR COMMINUTING AND CONVEYING FODDER

Paul Robert Theodor Treckmann, Rodau Uber Bensheim a. d. Bergstrasse, Germany, assignor to N. V. Maatschappij Tot Exploiteren van Octrooien en Licenties "Matepa" 's-Hertogenbosch, Netherlands, a corporation of the Netherlands Application October 15, 1951, Serial No. 251,435

Claims priority, application Germany October 16, 1950

4 Claims. (Cl. 146—107)

For conveying green fodder and like products centrifugal blowers are known, in which the material to be conveyed is introduced into a current of air produced by a blowing device, while in agriculture it is also known to pass such material through a blower in order to convey it. Moreover, it has also already been proposed to connect a comminuting machine, such as a chaff cutter, to such a blower.

The invention relates to a novel construction of a blower, which enables the latter to serve at the same time as a comminuting or shredding device.

According to the invention the blades of a centrifugal blower comprising a feed hopper and an outlet to be connected to a conveying conduit, consist of separate short and long teeth, which cooperate with cutter bars provided in the casing of the blower. Preferably two cutter bars are provided according to the invention, one of which is comb-shaped. In the successive blades the short and the long teeth are mounted in staggered relationship, in such a manner that the long teeth can pass through the spaces between the teeth of the comb-shaped cutter bar and past the cutting edge of the other cutter bar. As a result the material taken along by the blades out of the feed hopper, will be thoroughly comminuted on its way to the outlet between the blades and the cutter bars cooperating therewith. According to the invention that portion of the casing of the blower which links up with the feed hopper can be constructed as a flap yielding in opposition to a spring, in order to enable hard objects which may be present in the material, to be discharged from the blower. As circumstances require a conveying tube directed upwardly or more or less horizontally, is connected to the outlet of the blower.

In order to illustrate the invention an embodiment of the blower will be described with reference to the accompanying drawings, in which:

Figure 1 is a vertical longitudinal section of a movable apparatus;

Figure 2 is a section of the line II—II of Figure 1;

Figure 3 shows a comb-shaped cutter bar according to a section taken on the line III—III in Figure 1.

On a one axled carriage frame 1 a casing 3 of a blower provided with a feed hopper 2 is mounted, in which casing a drum 5 carrying blades 4 is rotatably supported. The drum 5 which via a belt 6 can be driven with a controllable speed by an electromotor 7 mounted on the carriage frame 1, displaces the material supplied by the feed hopper 2 towards the outlet 8, to which outlet, as circumstances require, a conveying tube 10 or 9 directed upwardly or more or less horizontally, is connected.

The blades 4 comprise short and long teeth 11 and 12, which according to a pre-determined distribution are mounted in staggered relationship in the successive blades. The shell 20 of the casing 3 is so dimensioned that its diameter is only little larger than the diametrical distance between, of the cutting edges of the long teeth 12.

The blades 4 cooperate with two cutter bars 13 and 14 mounted in the shell 20, cutter bar 13 which is the first as seen looking in the direction of rotation of drum, having a straight cutting edge turned towards the cutting edges of the teeth 12. The subsequent cutter bar 14 is comb-shaped and the teeth 15 of this cutter bar are distributed and dimensioned in accordance with the distribution and dimensions of the teeth 11 and 12, so that the teeth 15 form a comb through which the teeth 12 of the blades can pass. The material sucked out of the hoppe 2 by the drum 5 provided with the blades 4 is consequently thoroughly comminuted by the teeth 12 moving past the cutter bar 13 and by the teeth 11 moving past the teeth 15 and moving through the spaces between the teeth 15, and is subsequently conveyed to the outlet.

In order to prevent the cutter bars 13 and 14 and the blades 4 from being damaged, the portion of the shell of the casing 3 linking up with the hopper 2 is constructed as a flap 16 pivoting on a shaft 17, said flap being loaded by an adjustable spring 18. The flap 16 is guided between adjustable side walls 19 and will open under the pressure of a hard object jammed between the flap 16 and the blades 4. The flap 16 will finally run against a stop 21 on the side walls 19 and will thereafter take along these side walls. The bottom 22 connecting these side walls 19 is consequently moved backwards, so that the hard object will be discharged from the apparatus.

The apparatus according to the invention is not only suited for conveying and comminuting agricultural produce, but can also be used for conveying and comminuting industrial products.

I claim:

1. In a centrifugal blower for conveying and comminuting agricultural produce and the like, a feed hopper, a casing connected to said hopper for receiving and accommodating rotating parts, a rotary drum, a plurality of blades on said drum, said blades being parallel to the axis of rotation, said blades being formed by a plurality of adjacent teeth which in radial direction include both long and short teeth, a stationary cutter bar having a straight cutting edge, said bar being mounted on the casing at such a distance from the rotary blades, that the long teeth of the blades pass at a small distance from the said cutting edge, at least one comb-shaped cutter bar having protruding teeth with spaces therebetween, said comb-shaped bar being mounted on the casing, in the direction of rotation, behind said stationary cutter bar, the long teeth of the rotating blades during their rotation passing through said spaces and an outlet for the comminuted material connected to said casing.

2. In a centrifugal blower for conveying and comminuting agricultural produce and the like, a feed hopper, a casing connected to said hopper for receiving and accommodating rotating parts, a rotary drum, a plurality of blades on said drum, said blades being parallel to the axis of rotation, said blades being formed by a plurality of adjacent teeth which in radial direction include both long and short teeth, an odd number of short teeth being provided between each two long teeth, the long teeth of the separate blades being staggered relative to one another and being in different radial planes, a stationary cutter bar having a straight cutting edge, said bar being mounted on the casing at such a distance from the rotary blades that the long teeth pass a small distance from said cutting edge, at least one comb-shaped cutter bar having protruding teeth with spaces therebetween, said comb-shaped bar being mounted on the casing, in the direction of rotation, behind said stationary cutter bar, the long teeth of successive blades alternately passing through at least each second space, and an outlet for the comminuted material connected to said casing.

3. In a centrifugal blower as claimed in claim 1, wherein between the feed hopper and the first blade said casing is constructed as a flap and being pivotable outwards, and an adjustable spring biasing said flap to closed position.

4. In a centrifugal blower as claimed in claim 3, two side walls, said flap being guided between said two side walls, a bottom interconnecting said side walls and a stop for said flap.

PAUL ROBERT THEODOR TRECKMANN.

References Cited in the file of this patent

UNITED STATES PATENTS

| Number | Name | Date |
|---|---|---|
| 952,625 | McGrew | Mar. 22, 1910 |
| 1,143,106 | Davies et al. | June 15, 1915 |
| 2,064,689 | Russwurm et al. | Dec. 15, 1936 |
| 2,213,906 | Ebersol | Sept. 3, 1940 |

FOREIGN PATENTS

| Number | Country | Date |
|---|---|---|
| 577,081 | Germany | May 24, 1933 |